(12) United States Patent
Merli et al.

(10) Patent No.: US 8,164,508 B2
(45) Date of Patent: Apr. 24, 2012

(54) PROXIMITY SENSOR FOR A PARKING AREA

(75) Inventors: Silvio Merli, Genoa (IT); Alfonso Desiderio, Cogoleto (IT)

(73) Assignee: Elsag Datamat SpA, Genoa (IT)

(*) Notice: Subject to any disclaimer, the term of this patent is extended or adjusted under 35 U.S.C. 154(b) by 196 days.

(21) Appl. No.: 12/752,191

(22) Filed: Apr. 1, 2010

(65) Prior Publication Data
US 2010/0265118 A1  Oct. 21, 2010

(30) Foreign Application Priority Data
Apr. 1, 2009  (IT) ............. TO2009A0251

(51) Int. Cl.
*G01S 13/93* (2006.01)

(52) U.S. Cl. ............ 342/27; 342/70; 340/436; 340/903

(58) Field of Classification Search .......... 342/27, 342/70–72; 340/435, 436, 903; 701/301
See application file for complete search history.

(56) References Cited

U.S. PATENT DOCUMENTS

| | | | |
|---|---|---|---|
| 5,844,519 A | 12/1998 | Heierli et al. | |
| 6,215,415 B1* | 4/2001 | Schroder | 340/932.2 |
| 7,049,945 B2* | 5/2006 | Breed et al. | 340/435 |
| 7,227,474 B2* | 6/2007 | Zoratti et al. | 340/988 |
| 7,489,265 B2* | 2/2009 | Egri et al. | 342/70 |
| 7,570,198 B2* | 8/2009 | Tokoro | 342/70 |
| 2002/0109624 A1 | 8/2002 | Schutz et al. | |
| 2005/0024257 A1* | 2/2005 | Britton et al. | 342/70 |
| 2005/0134440 A1* | 6/2005 | Breed | 340/435 |
| 2007/0152870 A1* | 7/2007 | Woodington et al. | 342/70 |
| 2007/0211916 A1 | 9/2007 | Smith et al. | |
| 2008/0077327 A1 | 3/2008 | Harris et al. | |
| 2008/0266052 A1* | 10/2008 | Schmid | 340/5.1 |
| 2010/0201508 A1* | 8/2010 | Green et al. | 340/435 |
| 2010/0265118 A1* | 10/2010 | Merli et al. | 342/27 |
| 2011/0103650 A1* | 5/2011 | Cheng et al. | 382/104 |
| 2011/0241857 A1* | 10/2011 | Brandenburger et al. | 340/435 |

FOREIGN PATENT DOCUMENTS

| | | |
|---|---|---|
| EP | 0 348 036 A2 | 12/1989 |
| EP | 2237062 A1 * | 10/2010 |

* cited by examiner

*Primary Examiner* — John B Sotomayor
(74) *Attorney, Agent, or Firm* — Berenato & White, LLC

(57) ABSTRACT

A proximity sensor for a parking area designed to detect the presence of an obstacle constituted by a parked vehicle, comprises a transmitting radar, designed to send electromagnetic pulses towards the obstacle, a receiving radar, designed to receive the pulses reflected by the obstacle, and a processing circuit, designed to compare samples detected in a certain condition of absence of an obstacle in a calibration step with those detected in a condition of detection of an obstacle to determine the presence/absence of the obstacle.

10 Claims, 3 Drawing Sheets

PROXIMITY SENSOR FOR A PARKING AREA

CROSS-REFERENCE TO RELATED APPLICATIONS AND CLAIM TO PRIORITY

This application is a US Utility Patent Application, and claims priority to Italian Patent Application Number TO2009A 000251 filed Apr. 1, 2009.

The present invention relates to a proximity sensor for a parking area.

BACKGROUND OF THE INVENTION

Known to the art are proximity sensors for parking areas, which are designed to detect the presence/absence of a vehicle parked in a delimited area (stall, generally of a rectangular shape).

For example, known to the art are sensors that use magnetic components (normally inductors), made in the ground and designed to interact magnetically with the metal mass constituted by the vehicle, in order to detect the presence of the vehicle itself.

For example, the Italian patent application No. GE2004A000053 filed on Jun. 16, 2004 describes a sensor of the type illustrated above that uses magnetometric sensors designed to detect the perturbation of the Earth's magnetic field introduced by the presence of the metal mass of the vehicle. Said magnetometric sensors communicate with a central processing station by means of a wireless network.

It has moreover been proposed to use radar for detecting the presence/absence of vehicles in a parking area.

For example, the U.S. Pat. No. 5,777,951 generically describes the use of a radar sensor for detecting the presence/absence of a vehicle.

In actual fact the use of a radar sensor for detecting the presence/absence of a vehicle is a not immediately implementable function in so far as radars are configured for detecting generically the position of an object in space with respect to a reference and involve complex processing (in the frequency domain) of the signals received.

Consequently, it is currently not possible to use, with contained costs, radar sensors for determining the presence/absence of a vehicle in a parking area.

SUMMARY OF THE INVENTION

The aim of the present invention to provide a sensor for a parking area in which detection of the presence/absence of the vehicle is performed by a commercially available radar at contained costs and with a computational complexity of the received signals that is extremely low.

In particular, the aim of the present invention is to provide a sensor for a parking area that will not require a processing in the frequency domain of the signals received.

The above aim is achieved by the present invention in so far as it regards a proximity sensor for a parking area of the type as claimed in the attached claims.

BRIEF DESCRIPTION OF THE DRAWINGS

The invention will be now illustrated with particular reference to the attached figures, which represent a preferred non-limiting embodiment thereof, wherein.

DETAILED DESCRIPTION OF THE INVENTION

Figure 1:
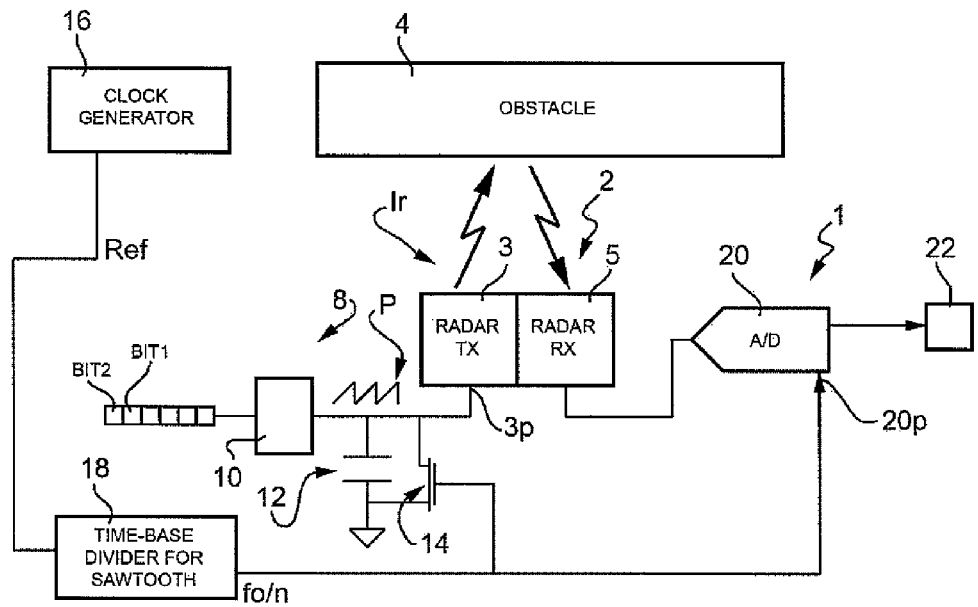
FIG. 1 illustrates a simplified electrical diagram of a proximity sensor for a parking area built according to the teachings of the present invention.

Designated, as a whole, by 1 in FIG. 1 is a proximity sensor for a parking area (typically a stall of a rectangular shape, not illustrated).

Figure 5:
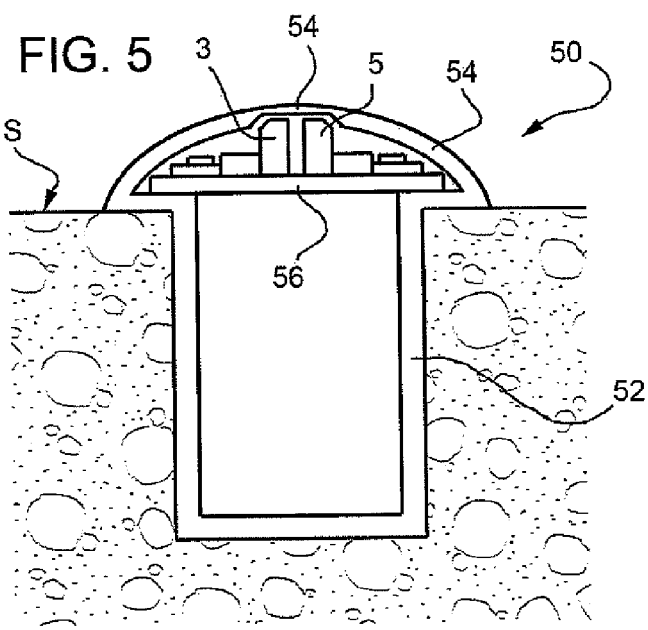
FIG. 5 is a schematic illustration of a container that houses the sensor of FIG. 1.

The sensor 1 is typically set inside a container (illustrated in FIG. 5), which is stably housed in a central portion of the ground that constitutes the stall in order to detect the presence of a vehicle parked in the stall itself.

The proximity sensor for parking areas 1 comprises a radar 2 typically built using FMCW technology.

As is known, according to FMCW technology a radar source with stable and continuous energy is modulated by a triangular modulation signal in such a way that the signal emitted varies over time in frequency and mixes with the signal reflected by a target object to produce beats.

The radar 2 comprises a transmitting section 3 (built by means with technologies and consequently not further described in detail), designed to produce and carry electromagnetic waves Ir towards an obstacle 4 (constituted precisely by a vehicle parked in the stall) of which the sensor 1 must detect the presence/absence.

The radar 2 further comprises a receiving section 5 (which is also built with known technologies and is consequently not further described in detail) designed to receive the electromagnetic wave Ir' as reflected by the obstacle 4 (vehicle).

The transmitting section 3 is driven by a driving-signal generator 8 designed to supply a variable sawtooth voltage (driving signal P) to a control terminal $3p$ of the transmitting section 3, which varies—using known techniques—the frequency of the electromagnetic waves Ir emitted as a function of the amplitude of the driving signal P.

The signal generator 8 comprises a programmable current generator 10, which charges a capacitor 12; the voltage Vc across the capacitor 12 produces the driving signal P. The programmable current generator 10 receives at input a voltage signal and generates at output a current proportional to the input signal.

The signal generator 8 further comprises a switch device 14 (schematically represented by a field-effect transistor) set across the capacitor 12 and designed to shortcircuit the capacitor 12 periodically to produce the falling edge of the sawtooth, the rising edge of which is formed during the linear charging of the capacitor 12. The system functions also with a signal having a different waveform and in particular with the rising edge steeper than the falling edge.

The circuit 1 comprises a reference clock generator 16, designed to supply at output a square-wave reference signal Ref (clock) with constant frequency fo, for example 16 MHz.

The reference signal Ref drives a time-base divider 18, which generates at output a signal, the frequency of which fo/n is a submultiple of the frequency fo; said signal is used for driving switching of the switch device 14 in such a way that the sawtooth driving signal P has a frequency fo/n that is a submultiple of the frequency fo.

The proximity sensor 1 comprises an analog-to-digital (A/D) converter 20, which is designed to sample the signal generated at output by the receiving radar 5.

The acquisition of the samples of the signal starts at the steeper edge (typically the falling edge in the example represented) of the sawtooth driving signal. For this purpose, a control input 20p of the A/D converter receives the output signal of the time-base divider 18.

In other words, the analog-to-digital converter 20 starts to detect samples at the falling edge of the signal P that drives the radar.

The sawtooth driving signal P is generated by the clock generator 16, which is synchronous with the analog-to-digital converter 20. In this way, each variation of frequency due to external phenomena, for example thermal phenomena, has an equal impact on the A/D converter 20 and on the driving-signal generator 8.

Said synchronization enables acquisition of all the signals strictly in phase.

The analog-to-digital converter 20 receives at input 20p a periodic signal having the same frequency as the sawtooth driving signal P.

To a first approximation, the signal generated by the receiving section of the radar and sent to the analog-to-digital converter varies only if the conditions external to the system vary (presence of obstacle).

The analog-to-digital converter 20 acquires a series of samples of the input signal coming from the receiving section 5 of the radar 2 at regular time intervals dT.

It is moreover highlighted how variations of capacitance of the capacitor 12 lead only to variations of amplitude of the sawtooth driving signal P (the frequency being fixed by the clock generator 16). Possible variations of amplitude of the driving signal P can be detected by a fixed-threshold comparator (not illustrated for reasons of simplicity in FIG. 1) and corrected via a digital-to-analog converter (not illustrated), which varies the charging current of the capacitor by acting on the programmable current generator 10.

The programmable current generator 10 receives at input a sequence of bits and generates a current that is a function of the numerical value expressed by said sequence of bits.

Figure 2:
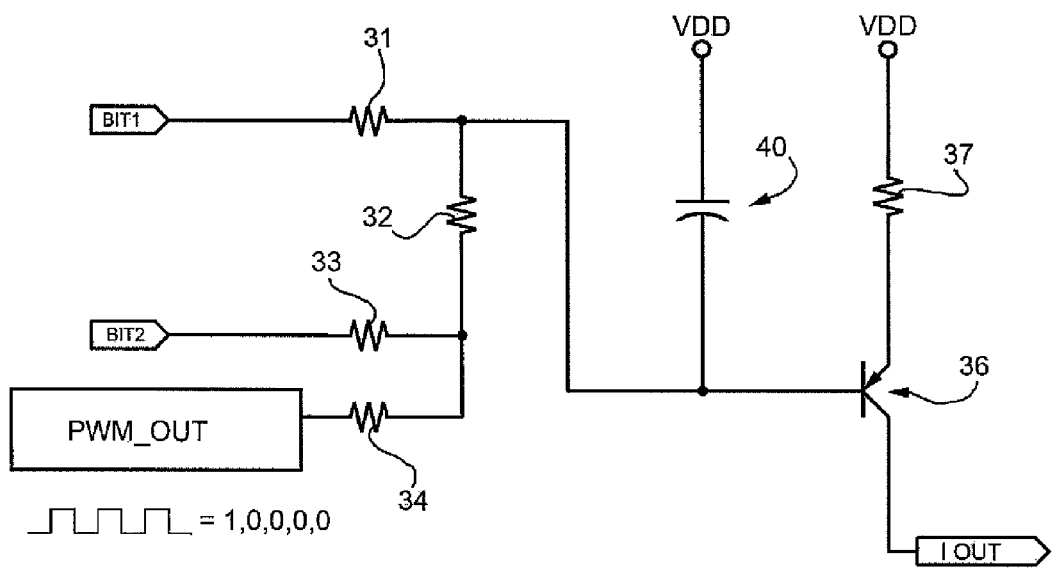
FIG. 2 illustrates a detail of the electrical diagram of FIG. 1.

In particular, the programmable current generator 10 comprises a resistive network (FIG. 2), which includes a first resistor 31 (resistance value R) having a first terminal and a second terminal that is connected to a first terminal of a second resistor 32 (resistance value equal to R/2) having a second terminal connected to the second terminals of a third resistor 33 (resistance value R) and of a fourth resistor 34 (resistance value R), which have first terminals.

The first terminal of the second resistor 32 communicates with the base terminal of a PNP transistor 36, which has its emitter connected to a reference voltage VDD through a fifth resistor 37. The collector of the PNP transistor 36 produces the output (I_OUT) of the programmable current generator 10 that supplies the capacitor 12.

A capacitor 40 is set between the reference voltage VDD (supplied by a battery) and the base of the PNP transistor 36. Supplied respectively on the first terminals of the resistors 31 and 33 are the most significant bit (BIT2) and the bit (BIT1) that, in the sequence of bits, has the next lowest significance, the least significant bits of said sequence being used for regulating the duty cycle of a square-wave signal supplied to the first terminal of the resistor 34.

The transfer function produced by the programmable current generator 10 is:

$$Iout = Imax \cdot ((BIT2/2) + (BIT1/4) + (PWM\_OUT/64)),$$

where:

Iout is the output current of the generator 10;
Imax is VDD−Vemitter/R;
Vemitter is the voltage between the ground of the circuit and the emitter terminal of the PNP transistor 36;
R is the resistance of the resistor 37;
BIT2 is the most significant bit in the sequence of bits—said bit BIT2 is applied to the first terminal of the resistor 31;
BIT1 is the bit having the next lowest significance after the most significant bit in the sequence—said bit BIT1 is applied to the first terminal of the resistor 33; and
PWM_OUT is a signal applied to the first terminal of the resistor 34.

In greater detail, the signal PWM_OUT is a square-wave signal with a variable duty cycle that is a function of the four least significant bits in the sequence of bits.

For example, in the case where the four least significant bits in the sequence assume value 0, the duty cycle is zero, namely, 0, 0, 0, 0 → duty cycle=0

In the case where, instead, the first of the four least significant bits is 1 and the other three are 0, the duty cycle is equal to 50%, namely, 1, 0, 0, 0 → duty cycle=50%

Finally, in the case where the four least significant bits in the sequence assume value 1, the duty cycle is 94%, namely, 1, 1, 1, 1 → duty cycle=94%

The signal sampled is supplied to a microprocessor processing device 22 (FIG. 1), which carries out a series of operations for detecting the presence/absence of the obstacle, as illustrated with reference to FIGS. 3 and 4.

The container 50 (FIG. 5) that houses the electronic circuit that constitutes the proximity sensor typically comprises a cylindrical tubular portion 52 integral with a hollow hemispherical end portion 54, which houses a printed circuit 56, arranged on which are the electronic components that make up the sensor 1. The container thus has a mushroom-shaped cross section.

The container 50 typically has contained dimensions (max. 12 cm in diameter), is hermetic, withstands heavy weights (in particular, weights higher than 2.5 tonnes), and is made of plastic material, which minimizes attenuation of the radar signals.

The thickness of the plastic material, only at the radiation lobe of the radar, is approximately 3 mm, equal to one quarter of the wavelength of the signal (24 GHz) irradiated.

The length of the cylindrical tubular portion 52 that is fixed in the ground S is approximately 80 mm. The container 50 is in fact set in the ground with just the hemispherical portion 54 that sticks out of the plane S defining the stall. Typically, the hemispherical portion 54 does not stick out of the plane S for more than 15 mm.

Preferably, the hemispherical portion 54 has a reduced thickness for an area corresponding to that in which the transmitting section 3 and the receiving section 5 are arranged. In this way, an acceptable compromise is achieved between mechanical strength of the container 50 and minimization of the interference on the radar.

Following upon switching-on of the proximity sensor 1 (the sensor is turned on at the moment of its installation in the car park) (block 100—FIG. 3) a calibration step is activated (block 110 following upon block 100) whereby the transmitting section 3 generates a pre-set number n (for example, equal 28) of electromagnetic pulses, which are received by the receiving section 5 in the absence of the obstacle 4.

The signal generated by the receiving section 5 representing the pulses received is sampled by the analog-to-digital converter 20 and then stored permanently.

On the received signal the amplitudes A1, A2, A3, ..., An corresponding to the various pulses received in the absence of an obstacle are identified.

Said amplitudes A1, A2, A3, ..., An (block 120 following upon block 110) are summed up to define a first threshold value thr1, namely, $$thr1 = A1 + A2 + A3 + \ldots + An$$

Next, the flow passes to a block 130 following upon block 120, where, once the calibration step of blocks 110 and 120 is through, actual detection of the presence of the obstacle 4 is carried out.

The detection algorithm is described in detail in what follows and is based upon the consideration that any obstacle 4 set in front of the sensor 1 generates a perturbation in the signal received by the receiving section 5 with respect to the signal that the receiving section 5 would receive in the absence of an obstacle.

For this purpose, the transmitting section 3 generates again a pre-set number n of electromagnetic pulses, which are received by the receiving section 5 (130).

The signal generated by the receiving section 5 representing the pulses received is sampled by the analog-to-digital converter 20 and then stored.

Figure 3:
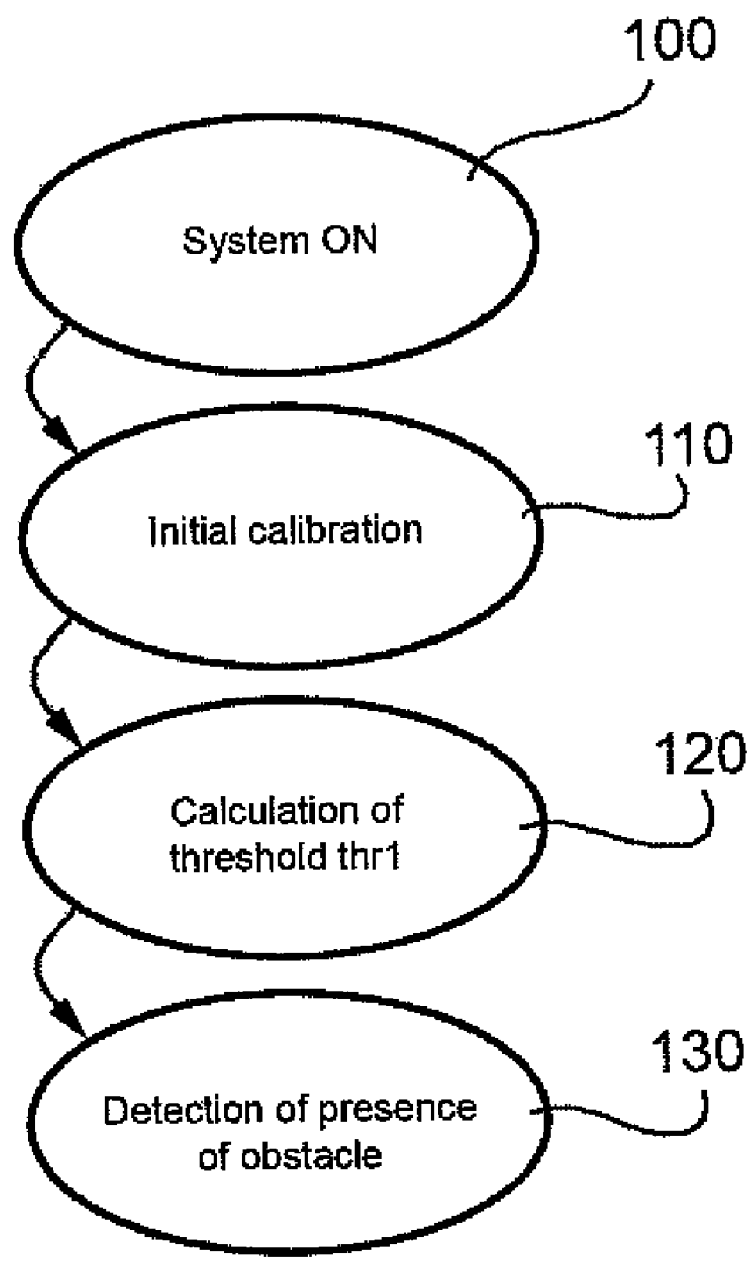
FIGS. 3 and 4 illustrate operations performed by the proximity sensor for a parking area according to the present invention.

On the received signal the amplitudes Ar1, Ar2, Ar3, ..., Arn corresponding to the various pulses received during detection of the presence/absence of an obstacle are identified (block 130 of FIG. 3).

Figure 4:
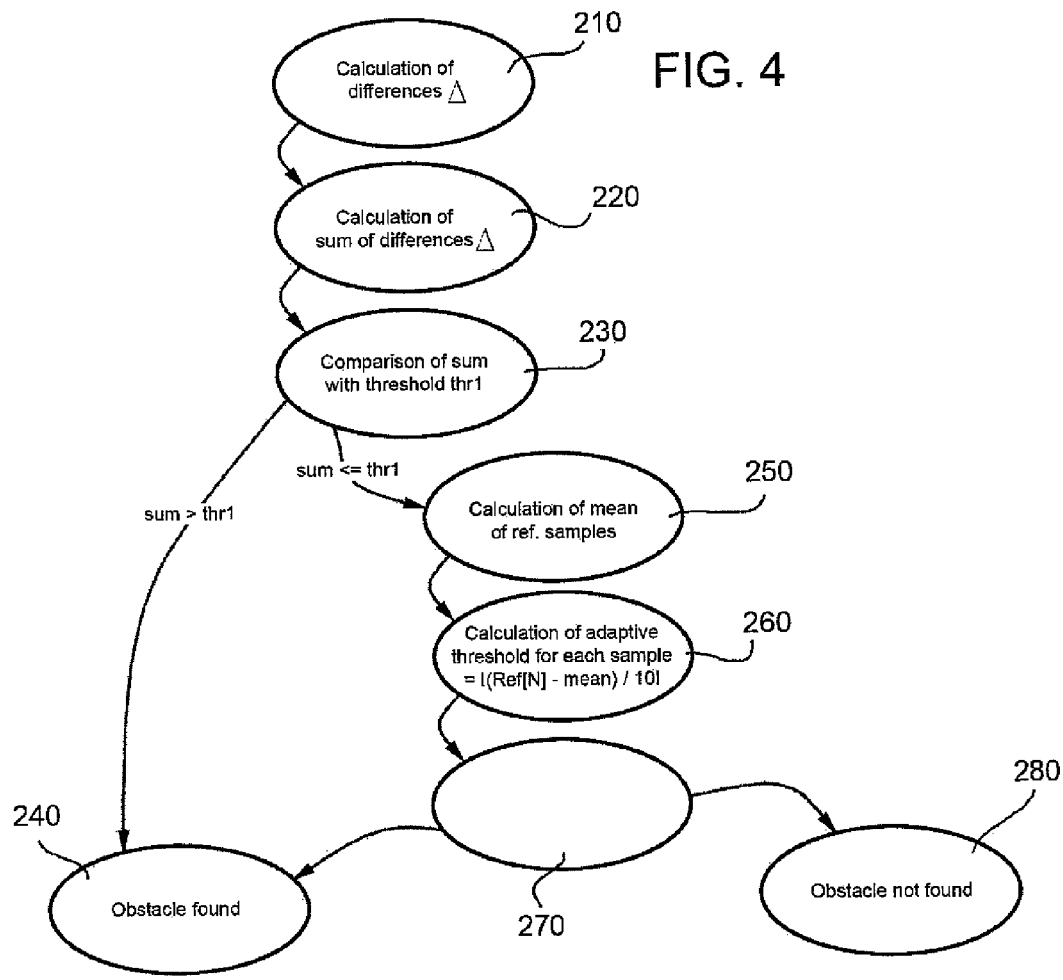

The absolute value of the difference between the respective amplitudes A1, A2, A3, ..., An detected during calibration and the amplitudes measured during detection Ar1, Ar2, Ar3, ..., Arn, are then calculated, namely, $\Delta 1 = (|A1-Ar1|)$, $\Delta 2 = (|A1-Ar1|)$, $\Delta 3 = (|A1-Ar1|)$, ..., $\Delta n = (|An-Arn|)$ (block 210 of FIG. 4).

Said differences $\Delta 1, \Delta 2, \Delta 3, \ldots, \Delta n$ are summed up to calculate a sum of differences sum-diff=$\Delta 1 + \Delta 2 + \Delta 3 + \ldots + \Delta n$ (block 220 FIG. 4).

The sum of differences sum-diff is then compared with the first threshold value thr1 defined in the calibration step (block 230 of FIG. 4).

In the case where the sum of differences sum-diff exceeds a pre-set percentage of the first threshold value thr1, namely, sum-diff>% thr1 (where % thr1 is determined as a percentage of the sum Ar1, Ar2, Ar3, ..., ArN, e.g. 10%) the presence of an obstacle 4 is detected (block 240 following upon block 230); otherwise, a more stringent algorithm is activated (block 250 and following blocks).

The more stringent algorithm (block 250 and following blocks) comprises the following operations:

calculation (block 250 following upon block 230) of the mean value mean of the N amplitudes A1, A2, A3, ..., AN corresponding to the various pulses received in the absence of an obstacle, namely, $$mean = (A1 + A2 + A3 \ldots + AN)/N$$

calculation in absolute value (block 260 following upon block 250) of the differences between the amplitudes A1, A2, A3, ..., AN corresponding to the various pulses received in the absence of an obstacle and the mean value, namely, $$|A1-mean|, |A2-mean|, |A3-mean|, \ldots, |AN-mean|$$

calculation (block 260) of an adaptive threshold thr_a1, thr_a2, thr_a3, ..., thr_aN for each sample as percentage of each respective difference, i.e., by multiplying each absolute value of the difference by a weight, namely, $$thr\_a1 = (|A1-mean|) \cdot weight1;$$

$$thr\_a2 = (|A2-mean|) \cdot weight2;$$

$$thr\_a3 = (|A3-mean|) \cdot weight3;$$

....

$$thr\_aN = (|AN-mean|) \cdot weightN;$$

calculation (block 270 following upon block 260) of the differences $\Delta 1, \Delta 2, \Delta 3, \ldots, \Delta N$ between the amplitudes A1, A2, A3, ..., AN corresponding to the various pulses received in the absence of an obstacle and the respective amplitudes Ar1, Ar2, Ar3, ..., Arn corresponding to the various pulses received during detection of the presence/absence of an obstacle; and comparison between each difference calculated and the respective adaptive threshold, namely, $\Delta 1$ compared with thr_a1;
$\Delta 2$ compared with thr_a2;
$\Delta 3$ compared with thr_a3;
...
$\Delta N$ compared with thr_aN;

In the case where a pre-set percentage (for example 25%) of said differences $\Delta 1, \Delta 2, \Delta 3, \ldots, \Delta N$ exceeds its own adaptive threshold thr_a1, thr_a2, thr_a3, ..., thr_aN, an obstacle is detected (block 240); otherwise, the obstacle is absent (block 280).

As highlighted above, a sufficiently large number (n) of reference samples (A1, A2, A3, ..., An) is compared with respective measurement samples (Ar1, Ar2, Ar3, ..., Arn); in the absence of an obstacle the two signals, and thus the two series of samples, must be practically the same and hence the differences $\Delta 1, \Delta 2, \Delta 3, \ldots, \Delta n$ are very small. In this case, also the sum of differences sum-diff will be small and will not exceed by a certain percentage % the threshold thr1.

In other words, the samples (A1, A2, A3, ..., An) of the "unperturbed" series are taken as reference during detection of obstacles by a comparison algorithm, which, with the aid of appropriate regulation parameters, carries out evaluation of presence of an obstacle.

The operations described with the aid of FIGS. 3 and 4 enable a comparison to be carried out in the time domain rather than in the frequency domain (as is normal to operate with signals received by radar), with consequent considerable lightening of the algorithm of calculation and marked reduction both of the consumption of the sensor 1 and of the hardware resources necessary for executing the required operations.

The invention claimed is:

1. A proximity sensor (1) for a parking area designed to detect the presence of an obstacle constituted by a vehicle parked in the parking area, comprising:
    a radar (5) provided with a transmitting section (3) designed to send electromagnetic pulses (Ir) towards the obstacle (4), and a receiving section (5) designed to receive the pulses reflected by the obstacle (4); and
    processing means (22) for processing the signal generated by the receiving section (5),
    calibration means (110, 120), designed to acquire and store a series of samples (A1, A2, A3, ..., An) of pulses detected by the receiving section (5) in response to the electromagnetic pulses generated by the transmitting radar (3) in a condition of certain absence of obstacle (4);

measuring means (130), designed to acquire and store a series of samples (Ar1, Ar2, Ar3, ..., Arn) of pulses detected by the receiving section (5) in response to the electromagnetic pulses generated by the transmitting section (3) in a condition of detection of an obstacle (4); and comparison means (230), designed to compare the samples detected in the condition of certain absence of obstacles (4) with the ones detected in the condition of detection of an obstacle (4) for determining the presence/absence of the obstacle (4).

2. The sensor according to claim 1, wherein the calibration means (110, 120) are configured to perform the following operations:

sampling the signal that is generated by the receiving section (5) and represents the pulses received;

identifying on the sampled signal the amplitudes (A1, A2, A3, ..., An) corresponding to the various pulses received in the absence of an obstacle; and adding together the values detected of the amplitudes (A1, A2, A3, ..., An) to define a first threshold value (thr1), i.e., (thr1)=(A1+A2+A3+ ... +An);

the measuring means (130) being configured to perform the following operations:

generating a pre-set number n of electromagnetic pulses that are received by the receiving section (5);

sampling the signal that is generated by the receiving section (5) and represents the pulses received;

identifying on the sampled signal the amplitudes (Ar1, Ar2, Ar3, ..., Arn) corresponding to the various pulses received;

computing the absolute value of the difference between the respective amplitudes (A1, A2, A3, ..., An) detected by the calibration means and the amplitudes detected by the measuring means (Ar1, Ar2, Ar3, ..., Arn), i.e., $\Delta 1$=(|A1−Ar1|), $\Delta 2$=(|A1−Ar1|), $\Delta 3$=(|A1−Ar1|), ..., $\Delta n$=(|An−Arn|);

adding together the differences ($\Delta 1$, $\Delta 2$, $\Delta 3$), ..., $\Delta n$ to calculate a sum of differences (sum-diff)=($\Delta 1$+$\Delta 2$+$\Delta 3$+ ... +$\Delta n$);

the comparison means (230) being configured to compare the sum of differences sum-diff with a reference value calculated as a function of the first threshold value thr1.

3. The sensor according to claim 2, wherein the comparison means (230) detect the presence (240) of an obstacle (4) in the case where the sum of differences sum-diff exceeds by a certain percentage % the first threshold value thr1.

4. The sensor according to claim 1, wherein means are present designed to implement a stringent algorithm (260) configured for:

calculating (250) the mean value mean of the N amplitudes (A1, A2, A3, ..., AN) corresponding to the various pulses received in the absence of an obstacle, i.e., mean =(A1+A2+A3 ... +AN)/N;

calculating (260) the differences, in absolute value, between the amplitudes (A1, A2, A3, ..., AN) corresponding to the various pulses received in the absence of an obstacle and the mean value, i.e., |A1−mean|, |A2−mean|, |A3−mean| ... |AN−mean|;

calculating (260) an adaptive threshold (thr_a1, thr_a2, thr_a3, ..., thr_aN) for each sample on the basis of the respective difference;

calculating (270) the differences ($\Delta 1$, $\Delta 2$, $\Delta 3$+ ... +$\Delta N$) between the amplitudes (A1, A2, A3, ..., AN) corresponding to the various pulses received in the absence of an obstacle and the respective amplitudes (Ar1, Ar2, Ar3, ..., Arn) corresponding to the various pulses received during detection of an obstacle; and comparing each difference calculated and the respective adaptive threshold, i.e., $\Delta 1$ compared with (thr_a1), $\Delta 2$ compared with (thr_a2), $\Delta 3$ compared with (thr_a3), ... $\Delta N$ compared with (thr_aN); and detecting an obstacle (240) in the case where a pre-set percentage of the differences $\Delta 1$, $\Delta 2$, $\Delta 3$+ ... +$\Delta N$ exceeds its own adaptive threshold (thr_a1, thr_a2, thr_a3, ..., thr_aN).

5. The sensor according to claim 4, wherein the adaptive threshold (thr_a1, thr_a2, thr_a3, ..., thr_aN) is calculated as percentage of each respective difference; i.e., it is obtained by multiplying each absolute value of the difference by a weight.

6. The sensor according to claim 1, wherein the transmitting section (3) of the radar (2) is configured for issuing electromagnetic pulses, the frequency of which varies as a function of a sawtooth driving signal (P) supplied on its input;

the proximity sensor (1) comprising an analog-to-digital converter (20), which is designed to sample the signal generated at output from the receiving section (5) on an edge, in particular the falling edge, of the driving sawtooth signal.

7. The sensor according to claim 6, wherein a single clock generator (16) concurs in creating the driving signal (P) and in synchronising the A/D converter (20).

8. The sensor according to claim 6, wherein:

a sawtooth-signal generator (8) is provided, comprising a programmable current generator (10) which charges a capacitor (12);

the voltage Vc across the capacitor (12) produces the driving signal (P); and the signal generator (8) further comprises a switch device (14) set across the capacitor (12) and designed to short-circuit periodically the capacitor itself (12) to form the falling edge of the sawtooth, the rising edge of which is formed during linear charging of the capacitor (12).

9. The sensor according to claim 8, wherein the programmable current generator (10) is configured for receiving at input a sequence of bits and generating at output a current proportional to the numerical value expressed by the sequence of bits.

10. The sensor according to claim 9, wherein the programmable current generator (10) produces a transfer function of the type:

$$(Iout)=(Imax)\cdot((BIT2/2)+(BIT1/4)+(PWM\_OUT/64))$$

where:

(Iout) is the output current of the generator (10);

(Imax) is a current calculated on the basis of the supply voltage (VDD) of the current generator and of circuit parameters (Vemitter/R) of the current generator itself;

BIT2 is the most significant bit in the sequence of bits;

BIT1 is the bit having an immediately lower value of importance with respect to the most significant bit in the sequence; and PWM_OUT is a square-wave signal with a variable duty cycle that is a function of the least significant bit in the sequence of bits.

* * * * *